United States Patent
Tao et al.

(10) Patent No.: US 12,544,410 B2
(45) Date of Patent: Feb. 10, 2026

(54) DRUG FOR PREVENTING AND/OR TREATING BRAIN TUMOR AND APPLICATION THEREOF

(71) Applicant: CAS Lamvac (Guangzhou) Biomedical Technology Co., Ltd., Guangdong (CN)

(72) Inventors: Zhu Tao, Guangdong (CN); Wenting Ding, Guangdong (CN); Zhipeng Cheng, Guangdong (CN); Yinfang Feng, Guangdong (CN); Li Qin, Guangdong (CN); Xiaoping Chen, Guangdong (CN)

(73) Assignee: CAS LAMVAC (GUANGZHOU) BIOMEDICAL TECHNOLOGY CO., LTD., Guangdong (CN)

( * ) Notice: Subject to any disclaimer, the term of this patent is extended or adjusted under 35 U.S.C. 154(b) by 490 days.

(21) Appl. No.: 17/910,763

(22) PCT Filed: Jul. 1, 2020

(86) PCT No.: PCT/CN2020/099658
§ 371 (c)(1),
(2) Date: Sep. 9, 2022

(87) PCT Pub. No.: WO2021/179494
PCT Pub. Date: Sep. 16, 2021

(65) Prior Publication Data
US 2023/0110635 A1    Apr. 13, 2023

(30) Foreign Application Priority Data
Mar. 13, 2020   (CN) .......................... 202010175342.2

(51) Int. Cl.
*A61K 35/68* (2006.01)
*A61P 35/00* (2006.01)

(52) U.S. Cl.
CPC .............. *A61K 35/68* (2013.01); *A61P 35/00* (2018.01)

(58) Field of Classification Search
CPC .......... A61K 35/68; A61P 35/00; A61P 35/04; Y02A 50/30
(Continued)

(56) References Cited

U.S. PATENT DOCUMENTS

| 4,767,622 A | 8/1988 | Ristic et al. |
| 2019/0015458 A1* | 1/2019 | Chen ........................ A61K 40/10 |
| 2022/0249643 A1* | 8/2022 | Tao ........................ A61K 39/015 |

FOREIGN PATENT DOCUMENTS

| CN | 109999190 A  * | 7/2019 |
| CN | 110124045 A | 8/2019 |

(Continued)

OTHER PUBLICATIONS

Machine Translation of CN-109999190-A; Original Document Published Jul. 12, 2019 (Year: 2019).*

(Continued)

*Primary Examiner* — Robert B Mondesi
(74) *Attorney, Agent, or Firm* — Wood, Phillips, Katz, Clark & Mortimer (57) ABSTRACT

A drug for preventing and/or treating a brain tumor and an application thereof. The drug comprises *plasmodium*. The drug has significant preventive and/or therapeutic effects on a brain tumor. The drug mainly regulates the immunological functions and inflammation-related factors of the body to break through the blood-brain barrier by fully activating immunocompetence and inhibiting the growth of a brain tumor, thereby extending lifespan.

11 Claims, 7 Drawing Sheets

(58) Field of Classification Search
USPC .......................................................... 424/93.1
See application file for complete search history.

(56) References Cited

FOREIGN PATENT DOCUMENTS

| CN | 110339350 A | 10/2019 |
|----|-------------|---------|
| WO | 2018133461 A1 | 7/2018 |

OTHER PUBLICATIONS

International Search Report for corresponding PCT Application No. PCT/CN2020/099658 mailed Dec. 14, 2020.
Huang et al., "Progresses on Antitumor Immune Mechanisms of Protozoon", Chinese Journal of Parasitology and Parasitic Diseases, vol. 33, No. 1, Feb. 28, 2015.
Adah et al., "Plasmodium Infection Inhibits the Expansion and Activation of MDSC's and Tregs in the Tumor Microenvironment in a Murine Lewis Lung Cancer Model", Cell Communication and Signaling, vol. 32, No. 17, Apr. 12, 2019.
De Flora et al., "Epidemiology of cancers of infectious original and prevention strategies", J. Prev Med Hyg, 2015, 56: E15-E20.
Wang et al., "Parasitic infections and cancer", China Tropical Medicine, Apr. 2019, vol. 19, No. 4.
Chinese Office Action in corresponding Chinese Application No. 202010175342.2 mailed Jan. 28, 2023.

* cited by examiner

DRUG FOR PREVENTING AND/OR TREATING BRAIN TUMOR AND APPLICATION THEREOF

TECHNICAL FIELD

The present application belongs to the technical field of biomedicine and specifically, relates to a drug for preventing and/or treating brain tumors and a use thereof.

BACKGROUND

The brain tumors are common clinical tumors and seriously threaten human health and survival. The brain tumors can be classified into primary brain tumors and metastatic brain tumors, and metastatic brain tumors are more common than primary brain tumors. Among metastatic brain tumors, lung cancer is the most common, followed by breast cancer and melanoma, accounting for 67% to 80% of the total brain metastases. The most common primary brain tumors are glioma, meningioma, pituitary adenoma and neurilemmoma in turn, among which glioma accounts for 40% to 50% of primary tumors, and malignant primary brain tumors account for 75% of glioma in adults. According to the grading system established by the WHO, glioma is classified into grade I (with the lowest grade of malignancy and the best prognosis) to grade IV (with the highest grade of malignancy and the worst prognosis). Glioblastoma corresponds to grade IV, belongs to malignant glioma and has a median survival time of only 14.6 months.

Compared with other cancers of the nervous system, lung cancer, liver cancer, breast cancer, and other cancers, brain tumors are unique for its onset site in the brain and the presence of a blood-brain barrier, the three conventional tumor treatment strategies, namely surgical resection, radiotherapy and chemotherapy, have certain limitations, which not only affects the exertion of the treatment, but also leads to serious toxic and side effects, seriously affecting the treatment of brain tumors. Among them, the surgical treatment is to remove the brain tumor as clean as possible while ensuring that the brain functions are not damaged. The tumors which are extremely difficult to cure, such as malignant glioma, show invasive growth, and the boundary with normal brain tissues is not obvious. Such tumors are hardly removed completely by surgery and are easily subject to recur, and there may also be brain postoperative complications such as bleeding, blood clots, swelling, etc. For brainstem glioma and brain tumors in the deep brain, the risk of the surgical treatment is greater. Therefore, at present, the most commonly used treatment method is surgical resection combined with radiotherapy or chemotherapy. However, radiotherapy may cause damage and necrosis of normal brain tissues, and there is also a risk of inducing new tumors and strokes. Although some chemotherapy drugs can improve the permeability of the blood-brain barrier to improve the drug efficacy, these drugs will cause side effects such as peritumoral edema, epilepsy, cognitive impairment and depression. Therefore, the prevention and treatment of brain tumors have always been a worldwide scientific problem.

The five-year survival rate of glioblastoma patients is only 3%. The continuous development of tumor immunotherapy has provided treatment strategies with high specificity, low toxic and side effects for brain tumors. Immunotherapy has been widely used in research and treatment of brain tumors, which can enhance anti-tumor immunity, but for malignant glioma, it has not yet achieved the expectation of improving the survival quality. The results of many early clinical trials show that although glioma vaccines may achieve certain therapeutic effects, they cannot improve survival in randomized controlled trials. Clinical trials of immune checkpoint inhibitors in the treatment of glioblastoma also show no significant effect on the survival of the patient, and glioblastoma does not respond to immune checkpoint inhibitors. Therefore, immunotherapy for brain tumors needs further study.

Due to the limited therapeutic effects of the three conventional therapies on brain tumors, the existing immunotherapy, such as targeted therapy and immune checkpoint inhibitors, is not satisfactory in clinical trial results and cannot improve survival. Therefore, it is very meaningful to develop a new treatment strategy that can achieve significant anti-brain tumor effects, which will also provide new treatment thoughts for brain tumors.

SUMMARY

The present application provides a drug for preventing and/or treating brain tumors and a use thereof. The drug is capable of significantly inhibiting the growth of the brain tumors and prolonging the life span of patients, crosses the blood-brain barrier to exert anti-tumor effects, has no obvious side effects and has a high safety level. The drug provides new treatment strategies and thoughts for brain tumors.

In one aspect, the present application provides a drug for preventing and/or treating brain tumors and a use thereof. The drug includes *Plasmodium*.

The drug provided by the present application crosses the blood-brain barrier by fully activating the immune system. Pathogen-related pattern recognition molecules (PAMPs) of danger signals released by *Plasmodium*, including known glycosylphosphatidylinositol anchors (GPI anchors), hemozoin, DNAs of *Plasmodium*, immunostimulatory nucleic acid motifs and other unknown molecules, can be recognized by pattern recognition receptors (PRRs) of host immune cells. The PRRs include toll-like receptors (TLRs) on endosomal membranes or cell membranes and RIG-I-like receptors (RLR) and NOD-like receptors (NLR) in the cytoplasm. PRRs activated by *Plasmodium* PAMPs trigger different transcription procedures, stimulate multiple downstream signaling pathways to induce systemic immune responses, release Th1 cytokines such as TNF-α, IL-1β, IL-2, IL-6, IL-12, Type I IFNs and Type II IFNs, activate NK cells, NKT cells, γ/δT cells, macrophages and dendritic cells (DCs), and then activate CD4+ T cells and CD8+ T cells. The number of regulatory T cells (Tregs), myeloid-derived suppressor cells (MDSCs) and tumor-associated macrophages (TAMs) in tumor tissues can be significantly reduced by down-regulating immunosuppressive factors such as TGF-β and IL-10 in tumor tissues so that the immunosuppressive microenvironment in the tumor can be reshaped into an immune supporting microenvironment and finally brain tumors can be transformed into effective brain tumor vaccines. On the other hand, damage-associated molecular patterns (DAMPs) of *Plasmodium* infection, such as endogenous uric acids, microvesicles and *Plasmodium*-infected red blood cells, also induce similar immunoactivity. Studies have shown that the meningeal lymphatic vessels, perivascular space, prelymphatic lymphatic system and perineurological lymphatic vessels play a vital role in the lymphatic circulation of the central nervous system, through which *Plasmodium* fully activates the immune system to cross the blood-brain barrier, thereby inhibiting the growth of the brain tumor and achieving the effects of preventing and/or treating brain tumors. Since the parasitemia can be easily controlled by antimalarial drugs, so as to control the toxic and side effects, the *Plasmodium* infection is controllable and safe in the clinic. The drug provides new thoughts for the prevention and/or treatment of brain tumors.

In an embodiment, the brain tumors include primary brain tumors or metastatic brain tumors.

In a preferred embodiment, the brain tumors include glioma, meningioma, pituitary adenoma or neurilemmoma, preferably glioma.

The drug provided by the present application has a good effect on the prevention and/or treatment of brain tumors, especially gliomas, and has an anti-brain tumor effect by inducing a strong anti-tumor immunoreaction.

In another embodiment, the *Plasmodium* includes any one or a combination of at least two of *Plasmodium falciparum*, *Plasmodium vivax*, *Plasmodium malariae*, *Plasmodium ovale* or *Plasmodium knowlesi*. The combination of the at least two of the *Plasmodium* may be, for example, a combination of *Plasmodium falciparum* and *Plasmodium vivax*, a combination of *Plasmodium malaria* and *Plasmodium ovale*, and a combination of *Plasmodium falciparum* and *Plasmodium vivax*, other combinations may be selected, and details will not be repeated herein. Preferably, *Plasmodium vivax* and *Plasmodium falciparum*.

In a preferred embodiment, the *Plasmodium* is cryopreserved and/or resuscitated *Plasmodium*. In another preferred embodiment, the *Plasmodium* is cryopreserved and/or resuscitated *Plasmodium* sporozoites.

The cryopreservation and resuscitation of *Plasmodium* include the following specific steps:

(1) Cryopreservation of *Plasmodium*
 (1.1) centrifuge the whole blood containing *Plasmodium* at 300×g for 5 minutes, and transfer the plasma to another 50 mL centrifuge tube;
 (1.2) remove the leukocyte layer, and add 2 volumes of 1640 culture medium, mix well and centrifuge at 300×g for 5 minutes;
 (1.3) drop an equal volume of 28% glycerol cryopreservation solution slowly into the 50 mL centrifuge tube, shake and mix well while adding, and incubate at room temperature for 5 minutes;
 (1.4) pack the RBC-glycerol cryopreservation solution mixture separately in cryopreservation tubes, 1.0 mL per tube;
 (1.5) put the cryopreservation tubes into a cryopreservation box and directly store the cryopreservation box into liquid nitrogen.
 (1.6) Quality control of cryopreservation: add a proper amount of the RBC-glycerol cryopreservation solution mixture before cryopreservation to a proper amount of RPMI 1640 culture medium, culture the resulting mixture in an incubator with $CO_2$ at 37° C. for 72 hours, and observe the color of the culture medium to confirm that there is no turbidity.

(2) Resuscitation of *Plasmodium*
 (2.1) Preparation: a water bath cauldron (37° C.), 50 mL centrifuge tubes, 3.5% NaCl solution, sodium chloride injection, a centrifuge, printed labels, and forms;
 (2.2) check labels of cryopreservation tubes.
 (2.3) take a cryopreserved *Plasmodium* blood and bath in water at 37° C. for 1 to 3 minutes, mixing well quickly and thawing;
 (2.4) transfer the cryopreserved *Plasmodium* blood to a 15 mL centrifuge tube, add the equal volume of 3.5% NaCl solution slowly along the tube wall, pipet the resulting mixture gently and mix well, stand at room temperature for 5 minutes, and discard the supernatant;
 (2.5) add 5 volumes of 0.9% NaCl solution along the tube wall, pipet gently and mix well, centrifuge at 300×g for 5 minutes, and discard the supernatant;
 (2.6) add normal saline until the hematocrit is 50%, mix well, count and record red blood cells density, and store the mixture temporarily at 4° C. for clinical inoculation.
 (2.7) Quality control of *Plasmodium* resuscitation: after inoculation: smear the remaining blood samples to form blood smears, and observe the parasitemia and the *Plasmodium* status by microscopy before injection, and record.

The cryopreservation and resuscitation of *Plasmodium* sporozoites include the following specific steps.

(1) Blood feeding of *Anopheles*
 (1.1) Prophase preparation: monitor the *Plasmodium* density and gametophyte of volunteers infected with *Plasmodium*, collect 2 mL of peripheral blood intravenously, and fasting of the *Anopheles* (more than 300) for 24 hours in advance;
 (1.2) before blood feeding, adjust the temperature of mosquito room to 26° C., prepare the membrane feeding system, and add the collected peripheral blood to the membrane feeding system for blood feeding for 30 minutes;
 (1.3) remove non-full *Anopheles*, write the labels, put the *Anopheles* into an incubator at 26° C., and add a sugar water cotton containing 10% glucose and 0.05% PABA.

(2) Oocyst examination
 (2.1) perform the oocyst examination 7 to 10 days after blood feeding and infection, dissect 10 *Anopheles*, and calculate the ratio of positive *Anopheles*; note: the standard of oocyst infection: +: 1 to 10; ++: 11 to 100; +++: 101 and above.
 (2.2) If the ratio of the oocyst infection "++" and above is less than 50%, 20 *Anopheles* are reexamined.

(3) Sporozoite examination
 (3.1) perform a sporozoite examination 14 to 16 days after blood feeding and infection, dissect 20 *Anopheles*, and calculate the total number of sporozoites and the average number of sporozoites of each *Anopheles*. It is to be noted that the count is carried out with a cell counting chamber, the number of all sporozoites in the large grid is counted according to the principle of "counting those on the top but not on the bottom, counting those on the left but not on the right". In order to minimize the error, in the counting process, the counting is carried out three times, and the average value of these counting is calculated.

(4) Sporozoite acquisition
 (4.1) 14 to 20 days after of blood feeding and infection, take out the *Anopheles*, disinfect the *Anopheles* with 75% ethanol 3 times for 5 seconds each time, and then wash the *Anopheles* with insect saline 3 times for 5 seconds each time; organize technicians to dissect salivary glands and collect the dissected salivary glands in an EP tube containing 200 μL of AB+ human serum, which is always placed on ice; notes: in the case of direct inoculation, the dissected salivary glands may be put into normal saline. Obtain salivary glands of *Anopheles*, and pipetted repeatedly with an 18G needle syringe for 30 to 40 times to crush the salivary glands and tissues, centrifuge at 1000 rpm at 4° C. for 5 minutes, and collect the supernatant containing sporozoites.

(4.2) Notes: the complete salivary gland of *Anopheles* needs to be dissected to avoid to collect tissue fragments, otherwise the crush of salivary glands and the purification of sporozoites will be affected; different sporozoites are acquired separately according to insect strains and labeled clearly to prevent cross-contamination between insect strains in the process of sporozoite acquisition; the acquisition process of sporozoites should be controlled to be carried out within 1 hour.

(5) Cryopreservation of sporozoites (5.1) Take a small amount of the preceding supernatant containing sporozoites, and count the sporozoites with a blood cell counting chamber;

(5.2) centrifuge the preceding supernatant at 12000 rpm at 4° C. for 10 minutes, discard the supernatant, add a proper amount of AB type human serum containing 1% triple antibiotics to resuspend the precipitate, and adjust concentration of sporozoites to $2.5 \times 10^8$/mL;

(5.3) pack the sporozoites separately into cryopreservation tubes, 200 μL per tube, label and put into liquid nitrogen at −80° C. for quick cryopreservation, and then 3 hours later, transfer the cryopreservation tubes to the liquid nitrogen tank.

(6) Direct inoculation of sporozoites (6.1) prepare 1 mL-syringes, 75% alcohol and cotton swabs;

(6.2) take a small amount of acquired sporozoites in normal saline suspension through sterile operation, count the sporozoites with a blood cell counting chamber, and adjust the sporozoite concentration to the quantity of inoculation;

(6.3) inoculate the sporozoites by intravenous injection, then isolate and observe;

(6.4) reserve a small number of pre-inoculation samples for sterility test and record;

(6.5) 3 days after inoculation, examine *Plasmodium* by microscopy every day through blood smears.

(7) Inoculation after sporozoite resuscitation (7.1) prepare 1 mL-syringes, 75% alcohol and cotton swabs;

(7.2) perform UV disinfection for more than 30 minutes;

(7.3) take preserved sporozoites out from the liquid nitrogen tank and thaw in a water bath cauldron at 37° C. for 1 to 2 minutes;

(7.4) centrifuge the sporozoites at 12000 rpm at 4° C. for 10 minutes, discard the supernatant, and add 10 volumes of normal saline for resuspension;

(7.5) centrifuge the sporozoites at 12000 rpm at 4° C. for 10 minutes, discard the supernatant, and add 200 μL of normal saline for resuspension;

(7.6) inoculate the sporozoites by intravenous injection, then isolate and observe;

(7.7) reserve a small number of pre-inoculation samples for sterility test and record;

(7.8) 3 days after inoculation, examine *Plasmodium* by microscopy every day through blood smears.

The above method of cryopreservation and resuscitation in the present application is more helpful in *Plasmodium* infecting, improving the infection efficiency and improving the effect of *Plasmodium* in preventing and/or treating brain tumors.

In another embodiment, the dosage form of the drug is any pharmaceutically acceptable, such as tablets, powders, suspensions, granules, capsules, injections, sprays, solutions, enemas, emulsions, films, suppositories, patches, nasal drops or drop pills.

In a preferred embodiment, the dosage form of the drug is injection.

In another embodiment, the drug further includes any one or a combination of at least two of pharmaceutically acceptable pharmaceutical adjuvant.

The drug provided by the present application may be administered alone or in combination with pharmaceutical adjuvant to form an appropriate dosage form. The pharmaceutical adjuvant include any one or a combination of at least two of a diluent, a thickener, an excipient, a flavoring agent, a filler, an adhesive, a wetting agent, a disintegrating agent, an emulsifier, a cosolvent, a solubilizer, an osmotic pressure regulator, a surfactant, a pH adjusting agent, an anti-oxidant, a bacteriostatic agent or a buffer. The combination of at least two of the above pharmaceutical adjuvant is, for example, a combination of a diluent and an excipient, a combination of an emulsifier and a cosolvent, a combination of a filler, and an adhesive and a wetting agent.

In another preferred embodiment, the drug is a drug carried on a pharmaceutical carrier.

In a preferred embodiment, the pharmaceutical carrier includes a liposome, a micelle, a dendrimer, a microsphere or a microcapsule.

In another aspect, the present application provides a use of the drug described above in the preparation of a drug for the prevention and/or treatment of a brain tumor.

In another aspect, the present application provides a method for treating brain tumors using the drug described above. The specific treatment method includes the following steps: use the drug described above on the patients of brain tumor. The method of use only needs to inject the drug described into and successfully infect with *Plasmodium* the patients of brain tumor, and those skilled in the art can choose the method known in the art according to the actual situation to input the drug, preferably by injection. The *Plasmodium* infection can be carried out through the bite of the natural vector female *Anopheles*, or by transfusing blood containing *Plasmodium*, or by using the syringes containing *Plasmodium* blood.

In an embodiment, the present application provides a method for treating the brain tumors. The method includes the following steps.

(a) administer a therapeutically effective dose of the drug provided by the present application to the patients; and (b) maintain *Plasmodium* infection to chronic or subacute phase.

In a preferred embodiment, step (b) includes the following step: the *Plasmodium* infection is maintained for 6 to 8 weeks.

In an embodiment, the brain tumors include primary brain tumors or metastatic brain tumors.

In an embodiment, the brain tumors include glioma, meningioma, pituitary adenoma or neurilemmoma, preferably glioma.

In an embodiment, the method further includes: (c) The antimalarial drug is administered to terminate the *Plasmodium* infection.

In an embodiment, steps (a), (b) and (c) are carried out once.

In another embodiment, steps (a), (b) and (c) are carried out many times to cause repeated *Plasmodium* infection. In the repeated *Plasmodium* infection in this embodiment, the kind of *Plasmodium* may be the same or different.

In the present application, any amount of *Plasmodium* that can infect the brain tumor patient with *Plasmodium* is feasible. According to individual differences of patients, the amount of *Plasmodium* that can be infected varies, and those skilled in the art can adjust the amount of *Plasmodium* according to the actual situation. The inoculation amount of *Plasmodium* in the present application is not less than 100 active red blood cells infected with *Plasmodium* or not less than 5 active *Plasmodium* sporozoites.

In the present application, the *Plasmodium* infection is long-term *Plasmodium* infection. The longer the infection period, the more significant the inhibition effect on brain tumors. The long-term *Plasmodium* infection is that the *Plasmodium* persists to the chronic phase or at least the subacute phase of the *Plasmodium* infection for a period of time and then is given an antimalarial drug to terminate the infection. After about 6 to 8 weeks of acute and subacute infection phases, the *Plasmodium* infection enters the chronic phase. At this point, only a small amount of *Plasmodium* can be detected in the peripheral blood, but there is no acute clinical symptom.

Since human can be re-infected with *Plasmodium* after the *Plasmodium* infection is cured and can also be repeatedly infected with different kinds of *Plasmodium*, the repeated *Plasmodium* infection can be formed. The *Plasmodium* infection can inhibit the growth of brain tumor cells, prevent the spread and metastasis of tumor cells, prolong the life span of brain tumor patients, provide longer treatment timing and immune environment for brain tumor patients, and contribute to the long-term survival and rehabilitation of brain tumor patients.

In the present application, the fever caused by the *Plasmodium* infection may promote the death of brain tumor cells. *Plasmodium* parasitemia is necessary to effectively inhibit the growth of brain tumors. However, in mice, *Plasmodium* only causes short-term infection without fever, and it is difficult to observe repeated *Plasmodium* infection in mouse models. In people without an effective antimalarial treatment, the *Plasmodium* infection can cause long-term parasitemia, accompanied by acute high fever, and such syndromes can be repeated many times throughout the life cycle. Therefore, *Plasmodium* naturally obtained by the bite of *Anopheles* or artificially obtained by the injection of sporozoites produces *Plasmodium* infection of the liver phase and blood phase. Continuous stimulation of the immune system can transform brain tumors into effective vaccines of brain tumor and plays therapeutic role on brain tumors through multi-pathways and multi-targets together with fever in the acute phase and inhibition of effects on tumor angiogenesis. In the medical literature, the febrile infection is related to the spontaneous regression of tumors, and malaria is a typical febrile infection.

Compared with the existing art, the present application has the beneficial effects below.

(1) The drug provided by the present application has remarkable preventive and/or therapeutic effects on brain tumors, can inhibit the growth of brain tumors and prolong the lifespan of patients.

(2) The drug provided by the present application has limited toxic and side effects and high safety. The *Plasmodium* immunotherapy mainly involves intermittent cold and fever attacks. Antimalarial drugs can be used to control the parasitemia to avoid severe cold and fever attacks, that ensure safety and prevent the normal function of the brain and the functions of other organs and tissues from damage.

(3) The drug provided by the present application expands treatment methods for brain tumors. Due to the specificity and sensitivity of brain tissues, chemotherapeutic drugs cannot easily cross the blood-brain barrier and exert anti-tumor effects. Many targeted drugs cannot enter brain tumors to exert direct anti-tumor effects. The radiotherapy requires radiation to the brain. The drug provided by the present application mainly regulates the immunological functions and inflammation-related factors of the body to inhibit the growth of brain tumors, thereby prolonging the lifespan of patients.

(4) The long-term *Plasmodium* infection has better therapeutic effects on brain tumors, and the *Plasmodium* immunotherapy provided by the present application does not take fever time as the treatment course standard when used for treating brain tumors, but should prolong the *Plasmodium* infection time until the tumor progress can be controlled on the premise of protecting the organ function and life safety of patients.

(5) The drug provided by the present application and the *Plasmodium* immunotherapy carried out by using the preceding drug are relatively economical and have relatively few side effects. Only the simple symptomatic treatment is required, only the blood routine and functions of the liver and kidney need to be monitored, and there is no additional other expense for the patients. Moreover, the treatment can be retreated or terminated at any time according to the change of the disease condition, and the course of treatment is artificially controllable. The treatment can not only reduce the burden on the patients, but also integrate the advantages of immunotherapy, fever therapy and antiangiogenic therapy.

DETAILED DESCRIPTION

The technical solutions of the present application are further described below through the detailed description. It is to be understood by those skilled in the art that examples described herein are merely used for a better understanding of the present application and are not to be construed as specific limitations of the present application.

Example 1

This example provides a method of cryopreservation and resuscitation of *Plasmodium* blood, and the specific operations are as follows.

After the blood infected with *Plasmodium* was stored in the warehouse, the *Plasmodium* blood was quickly packed separately as required, and the packaged *Plasmodium* blood was labeled and cryopreserved in liquid nitrogen.

(I) Cryopreservation of *Plasmodium*

(1) Preparation of Experimental Materials:

*Plasmodium*: the peripheral blood of a malaria patient without other legal blood-borne infectious diseases, or *Plasmodium* blood cultured in the laboratory;

- reagents: sodium chloride injection, 10% NaCl solution, 3.5% NaCl solution, RPMI1640 culture medium, and 28% glycerol cryopreservation solution (by mixing 28 g of glycerol, 3 g of sorbitol and sodium chloride injection and filling the volume of the mixture to 100 mL);
- consumables: cryopreservation tubes, 50 mL centrifuge tubes, 15 mL centrifuge tubes, 250 mL culture medium bottles, Pasteur pipettes, printed labels, and registration forms;
- instruments: pipettors, pipettes, sterilization scissors, and liquid nitrogen tank.

(2) Blood collection and microscopic examination: An appropriate amount of *Plasmodium* blood samples were taken to make thin blood smears for microscopic examination. The 30% and more of cryopreserved *Plasmodium* were in the early trophozoite phase. The report of microscopic examination was written.

(3) 20 mL *Plasmodium* blood per tube was centrifuged at 300×g for 10 minutes (the acceleration and deceleration speeds were set to 1), and the plasma was transferred to new 50 mL centrifuge tubes.

(4) The buffy coat in the upper layer at the bottom of the centrifuge tubes was sucked off, 1640 culture medium with twice the volume of *Plasmodium* blood was added, and the resulting mixture was mixed well and centrifuged at 300×g for 5 minutes (the acceleration and deceleration speeds ware set to 1).

(5) Gently flick the bottom of the 50 mL centrifuge tubes. 28% glycerol cryopreserved solution whose volume was equal to that of *Plasmodium* blood was slowly added into the 50 mL centrifuge tubes, and the resulting mixture was pipetted evenly using a pipettor and incubated at room temperature for 5 minutes.

(6) The mixture of RBC and 28% glycerol cryopreservation solution was separately packed in cryopreservation tubes, 1.0 mL volume per tube, labeled with printed labels, put into cryopreservation boxes and directly put into liquid nitrogen for cryopreservation.

(7) Quality control of cryopreservation: An appropriated amount of the RBC-28% glycerol cryopreservation solution mixture before cryopreservation was added to an appropriated amount of 10% FBS-RPMI1640 culture medium, the resulting mixture was cultured in an incubator with $CO_2$ at 37° C. for 72 hours, and the color of the culture medium was observed to confirm that there was no turbidity.

(II) Resuscitation of *Plasmodium*

(1) Preparation of reagents and consumables: a water bath cauldron (37° C.), 15 mL centrifuge tubes, 3.5% NaCl, sodium chloride injection, centrifuges, printed labels, and forms.

(2) The cryopreserved *Plasmodium* blood (1.0 mL per tube) was quickly shaken in a 37° C. water bath cauldron and quickly thawed to keep the activity of *Plasmodium.*

(3) The *Plasmodium* blood was added to 15 mL centrifuge tubes, the equal volume of 3.5% NaCl was slowly added along the tube wall, the resulting mixture was gently pipetted, mixed well, allowed to stand at room temperature for 5 minutes and centrifuged at 300×g for 5 minutes, and the supernatant was discarded.

(4) 0.9% NaCL solution whose volume was 5 times that of *Plasmodium* blood was added along the tube wall, gently pipetted, mixed well and centrifuged at 300×g for 5 minutes, and the supernatant was discarded.

(5) Normal saline was added until the hematocrit was 50% and mixed well, the red blood cell density was counted and recorded, and the resulting mixture was temporarily stored at 4° C. for clinical inoculation.

(6) Quality control of resuscitation: After inoculation, the remaining blood samples were smeared to form blood smears, and the *Plasmodium* parasitemia and the *Plasmodium* status before injection were observed by microscopic examination and recorded.

Example 2

This example provides a method of cryopreservation, resuscitation and inoculation of *Plasmodium* sporozoites, and the specific operations are as follows.

(I) Blood Feeding of *Anopheles* and Acquisition of Sporozoites;

(1) Preparation of *Anopheles*: More than 300 *Anopheles* were fasted for 24 hours in advance.

(2) Collection of *Plasmodium* blood: The *Plasmodium* density and gametophyte of the volunteers with malaria were detected, and 2 mL of peripheral blood of the volunteers was collected intravenously, immediately put into a thermos cup and transported to the mosquito room within 2 hours.

(3) Blood feeding of *Anopheles*: Before blood feeding, the temperature of the mosquito room was adjusted to 26° C., the membrane feeding system was prepared, and the collected peripheral blood was added to the membrane feeding system for blood feeding for 30 minutes.

(4) *Anopheles* feeding: The non-full *Anopheles* were removed, the labels were written, the *Anopheles* were put in an incubator at 26° C., and the sugar water cotton containing 10% glucose and 0.05% PABA was put in the incubator.

(5) The temperature before and after the transportation of thermos cup, blood feeding time, the number of *Anopheles* and blood feeding situation of *Anopheles* were recorded.

(6) Oocyst examination: 7 to 10 days after blood feeding and infection, the oocyst examination was carried out, 10 *Anopheles* were dissected, and the ratio of positive *Anopheles* was calculated. The standard of oocyst infection degree was as follows: +: 1 to 10; ++: 11 to 100; +++: 101 and above; if the ratio of the oocyst infection degree "++" and above was less than 50%, 20 *Anopheles* were reexamined.

(7) Sporozoite examination: 14 to 16 days after blood feeding and infection, sporozoite examination was carried out, 20 *Anopheles* were dissected, and the total number of sporozoites and the average number of sporozoites each *Anopheles* were calculated.

(8) Sporozoite acquisition: After 14 to 20 days of blood feeding and infection, *Anopheles* were taken out, disinfected with 75% ethanol 3 times, 5 seconds each time, and then washed with insect saline 3 times, 5 seconds each time. The salivary glands were dissected and collected in the EP tubes containing 200 μL of AB+ human serum. The EP tubes were always placed on ice.

In a case of direct inoculation, the dissected salivary glands were just directly put into normal saline.

(9) The salivary glands of *Anopheles* were obtained and repeatedly pipetted with an 18G needle syringe 30 to 40 times to crush the salivary glands and tissues and centrifuged at 1000 rpm at 4° C. for 5 minutes, and the supernatant containing sporozoites was collected. The complete salivary gland of *Anopheles* was dissected to avoid to collect tissue fragments, otherwise the crush of salivary glands and the purification of sporozoites were affected; sporozoites were better to be acquired separately according to different insect strains and labeled clearly to prevent cross-contamination between different insect strains in the process of sporozoite acquisition; the acquisition process of sporozoites was controlled to be carried out within 1 hour.

(II) Cryopreservation of Sporozoites (1) A small amount of the preceding supernatant containing sporozoites was taken out, and the sporozoites were counted with a blood cell counting chamber.

(2) The preceding supernatant was centrifuged at 12000 rpm at 4° C. for 10 minutes, the supernatant was discarded, an appropriate amount of AB type human serum containing 1% triple antibiotics was added for resuspension and precipitation, and the sporozoite concentration was adjusted to $2.5 \times 10^8$/m.

(3) The sporozoites were separately packed into cryopreservation tubes, 200 μL per tube, labeled, put into alcohol at −80° C. for quick cryopreservation, and then 3 hours later, transferred to the liquid nitrogen tank.

(III) Direct Inoculation of Sporozoites (1) A small amount of acquired sporozoite suspended in normal saline suspension was taken out through sterile operation, the sporozoites were counted with a blood cell counting chamber, and the sporozoite concentration was adjusted to the inoculation quantity.

(2) The sporozoites were inoculated by intravenous injection, then isolated and observed. A small number of samples before inoculation were reserved for sterility test and recorded. 3 days after inoculation, *Plasmodium* was examined by microscopy every day through blood smears.

(IV) Inoculation after Sporozoite Resuscitation (1) The preserved sporozoites were taken out from the liquid nitrogen tank and thawed in a water bath cauldron at 37° C. for 1 to 2 minutes.

(2) The sporozoites were centrifuged at 12000 rpm at 4° C. for 10 minutes, the supernatant was discarded, and 10 volumes of normal saline were added for resuspension.

(3) The sporozoites were centrifuged at 12000 rpm at 4° C. for 10 minutes, the supernatant was discarded, and 200 μL of normal saline was added for resuspension.

(4) The sporozoites were inoculated by intravenous injection, then isolated and observed.

(5) A small number of samples before inoculation were reserved for sterility test and recorded.

(6) 3 days after inoculation, *Plasmodium* was examined by microscopy every day through blood smears.

Example 3

This example explores the therapeutic effect of *Plasmodium* infection on tumor-bearing mice in subcutaneous inoculation models of brain tumor.

(I) Experimental Materials and Reagents animal: C57BL/6 mice, female, 6 to 8 weeks old, from SHANGHAI SLAC LABORATORY ANIMAL CO. LTD.; *Plasmodium*: mouse *Plasmodium yoelii* (*P. yoelii* 17XNL, MRA-593, Py), freely offered by MALARIA RESEARCH AND REFERENCE REAGENT RESOURCE CENTER (MR4); microscope: Olympus® microscope CX31; Vernier® caliper: electronic digital vernier caliper, No.: 678040, purchased from EXPLOIT TOOLS; Giemsa dye powder: purchased from Sigma-Aldrich® Company; pathological-grade slide: No.: 10127101P-G, purchased from JIANGSU CITOTEST LABWARE MANUFACTURING CO., LTD.; cedar: from SHANGHAI BIAOBEN MOULD FACTORY; PBS buffer: SH30256.01, purchased from Hyclone® Company; and normal saline: purchased from CISEN PHARMACEUTICAL CO., LTD.

(II) Experimental Steps (1) An animal model was established in the following specific method.

(1.1) Cell revival: The mouse glioma cell line GL261 was revived and incubated in an incubator with 5% $CO_2$ at the constant temperature of 37° C.

(1.2) Cell amplification culture: Cells were passaged every 2 to 3 days, and when the cells grew to 80% of the bottom of the petri dish, the cells were digested with 0.25% trypsin-EDTA digestion solution, passaged at a dilution of 1:3.

(1.3) Mouse shaving: C57BL/6 mice were shaved clean from the right scapula to the right back.

(1.4) Preparation of single cell suspension: The cells in the logarithmic growth phase were digested with 0.25% trypsin-EDTA digestive solution, washed with PBS 3 times and then resuspended with serum-free 1640 medium, with the cell concentration of $5 \times 10^6$.

(1.5) Subcutaneous inoculation of tumor cells in mice: C57BL/6 mice were subcutaneously inoculated in the right scapular region. Each mouse was injected with 0.1 mL volume of cell suspension with an inoculation dosage of $5 \times 10^5$ GL261 cells/mouse. The day of inoculation was recorded as Day 0 of tumor inoculation.

(IV) Experimental grouping: Mice were randomly divided into two groups according to the weight of the mice: a glioma control group (GL261) and a *P. yoelii* treatment group (GL261+Py), 10 mice per group.

(2) Tumor-bearing mice were inoculated with *Plasmodium* in the following specific method.

(2.1) *Plasmodium* revival: Murine *Plasmodium* blood (1.0 mL/vial) cryopreserved in a liquid nitrogen tank was quickly shaken in a 37° C. water bath cauldron, mixed well and thawed to keep the activity of *Plasmodium*.

(2.2) *Plasmodium* inoculation: After the *Plasmodium* blood was mixed well, the *Plasmodium* blood was inoculated intraperitoneally into C57BL/6 mice with 0.2 mL/mouse, and two mice were inoculated each time as breeding mice.

(2.3) Preparation of thin smear film and microscopic examination: About 1 to 1.5 μL of blood was collected from tails of mice and smeared on slides to prepare a long tongue-shaped thin smear film with a length of 2.5 cm, and the prepared smear was blow-dried with a blower. The smear film was infiltrated with methanol for 1 minute, stained with 1× Giemsa stain solution for 30 minutes, rinsed with tap water and blow-dried. The *Plasmodium* infection rate was observed by a 100× oil immersion objective lens. Changes of the *Plasmodium* parasitemia were observed.

(2.4) Preparation of a *Plasmodium* solution: When the parasitemia reached 3% to 10%, the red blood cells (of one breeding mouse infected with *Plasmodium* and one Naïve mouse not inoculated with *Plasmodium*) were counted. 5 μL of blood was taken from tails and resuspended in 995 μL of PBS, the red blood cells were counted, and the number of red blood cells infected with *Plasmodium* per mL was calculated. An EP tube was moistened with 0.2 mL of 3.8% sodium citrate anticoagulant, the blood was taken from eyeballs, the required concentration and total amount of *Plasmodium* to be inoculated were calculated, and the *Plasmodium* was prepared into a concentration of $2.5 \times 10^6$/mL with PBS.

(2.5) Inoculation of tumor-bearing mice: 1 day after the tumor was subcutaneously inoculated, each mouse was inoculated with 0.2 mL of red blood cell solution, each mouse in the *P. yoelii* treatment group was inoculated with the red blood cell solution containing $5 \times 10^5$ *Plasmodium* parasites, and each mouse in the control group was inoculated with the same volume of red blood cell solution containing no *Plasmodium*.

(3) Detection index (3.1) Tumor volume measurement: The tumor volume was measured every 3 days by the formula for calculating the volume of an ellipsoid (unit: cubic mm): $(D \times d \times d)/2$, where D denotes the long diameter of tumor, and d denotes the short diameter of the tumor. The size of the tumor was represented by a mean tumor volume±standard error of the mean (SEM), and the tumor growth curve was drawn. The statistical analysis between groups was performed by two-way analysis of variance (ANOVA), where "*" represents $p \leq 0.05$, and "**" represents $p \leq 0.01$, indicating that differences between groups were statistically significant.

(3.2) Survival statistics of mice: The survival was evaluated by the median survival time and the percentage of prolonged survival time. The survival rate was estimated by the Kaplan-Meier method, and the survival curve was drawn, and the median survival time was calculated, where "*" represents $p \leq 0.05$, and "**" represents $p \leq 0.01$, indicating that differences between groups were statistically significant.

(3.3) Statistics of the *Plasmodium* parasitemia: The *Plasmodium* parasitemia was evaluated by a percentage of red blood cells infected with *Plasmodium* in mice, where the calculation formula was (number of red blood cells infected with *Plasmodium*/total number of red blood cells)×100%. Specific operations are as follows: blood was taken from tail veins and smeared on the slides, fixed with methanol, and stained with Giemsa stain solution. The number of red blood cells infected with *Plasmodium* and the total number of red blood cells were observed under the microscope. The total number of red blood cells was about 1000. The *Plasmodium* parasitemia was calculated and represented by a mean parasitemia±standard error of the mean (SEM). The cycle curve of *Plasmodium* infection was drawn, and whether the chemotherapeutic agent had an effect on *Plasmodium* infection was observed.

(3.4) Mice weight: The mice were weighed every 3 days, and the weight growth was represented by the mean weight±standard error of the mean (SEM). The effect of the *Plasmodium* infection on the weight of tumor-bearing mice was observed.

Figure 1:
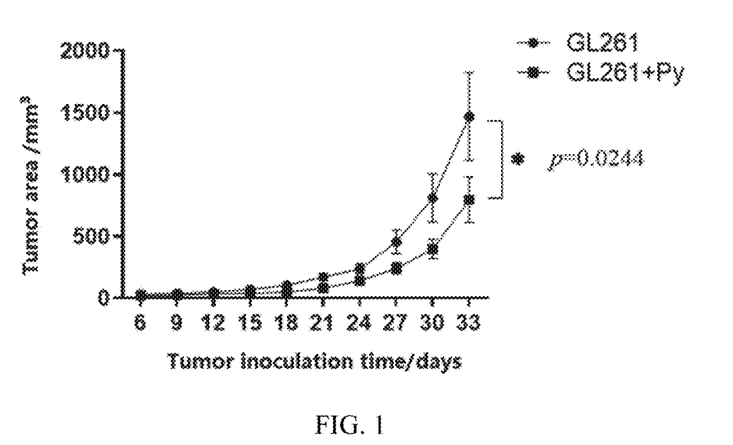
FIG. 1 shows results of the effect of *Plasmodium* infection on the glioma growth in tumor-bearing mice in subcutaneous inoculation model.

(4) Experimental results (4.1) The tumor growth curve is shown in FIG. 1. Compared with the uninfected control group, in the *Plasmodium* treatment group, the *Plasmodium* infection significantly inhibited the growth of glioma GL261 (p=0.0244, *).

Figure 2:
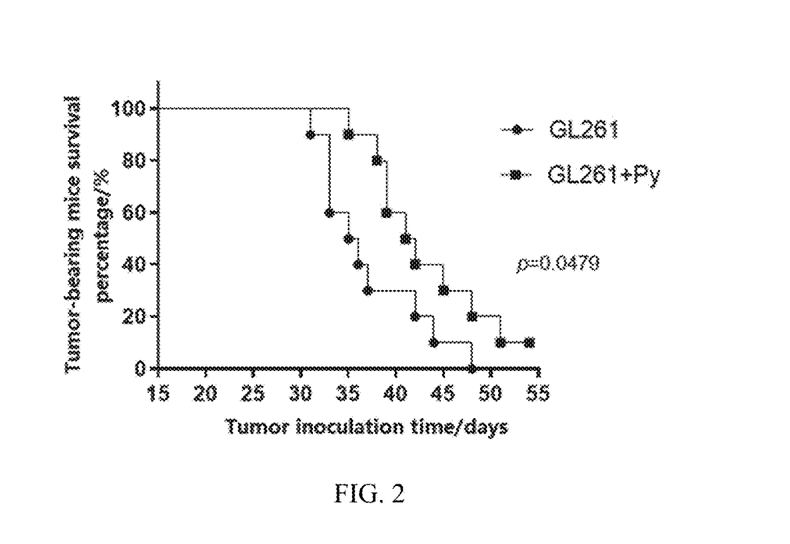
FIG. 2 shows results of the effect of *Plasmodium* infection on the survival time of tumor-bearing mice in subcutaneous inoculation model.

(4.2) The survival curve of tumor-bearing mice is shown in FIG. 2. Compared with the uninfected control group, in the *Plasmodium* treatment group, the *Plasmodium* infection significantly prolonged the survival time of tumor-bearing mice (p=0.0479, *), and the median survival time was prolonged from 35.5 days to 41.5 days.

Figure 3:
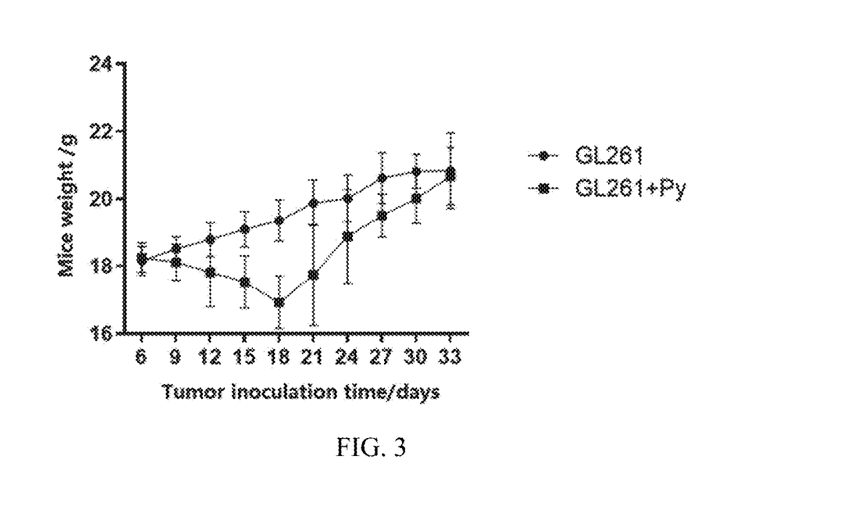
FIG. 3 shows results of the effect of *Plasmodium* infection on the weight of tumor-bearing mice in subcutaneous inoculation model.
Figure 4:
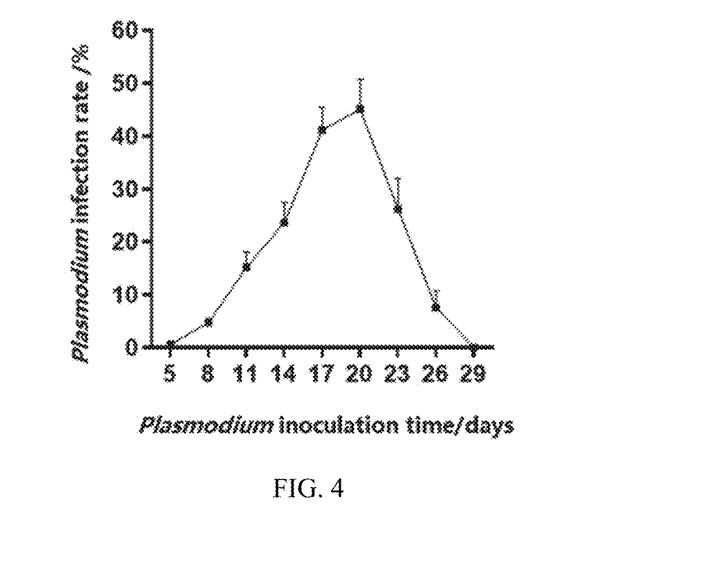
FIG. 4 is the trend chart of the *Plasmodium* parasitemia of the *Plasmodium* treatment group in subcutaneous inoculation model.

(4.3) The weight change of tumor-bearing mice is shown in FIG. 3, and the change of *Plasmodium* infection rate is shown in FIG. 4. With the increase of *Plasmodium* infection, the weight of tumor-bearing mice gradually decreased, the weight was the lowest when the parasitemia was the highest, and then with the gradual decrease of *Plasmodium* infection, the weight of mice gradually increased.

Example 4

In this example, the GL261/mcherry-luc cell line was constructed for exploring the therapeutic effect of *Plasmodium* infection on tumor-bearing mice in intracranial in situ inoculation models of brain tumor in Example 5.

(I) Experimental Materials and Reagents cells: GL261, mouse glioma cell line; HEK293T cell line for lentivirus packaging; plasmid: pWPXLd-mcherry-F2A-Luciferase-Puro; transfection reagent: PEI, purchased from POLYSCIENCES COMPANY; Bright-Glo™ luciferase detection system: from Promega® Company; Countstar FL automatic cell fluorescence analyzer: purchased from SHANGHAI COUNTSTAR INC.; endotoxin-free plasmid DNA mass extraction kit: N1051, purchased from GUANGZHOU DONGSHENG BIOTECH CO., LTD.; puromycin: purchased from Invivogen® Company; DMEM basic medium: 11995065, purchased from Gibco®; FBS fetal bovine serum: 04-001-1ACS, purchased from BIOLOGICAL INDUSTRIES; Opti-MEM® I Reduced Serum Medium: No. 31985-070, purchased from THERMOFISHER INC.

Figure 5:
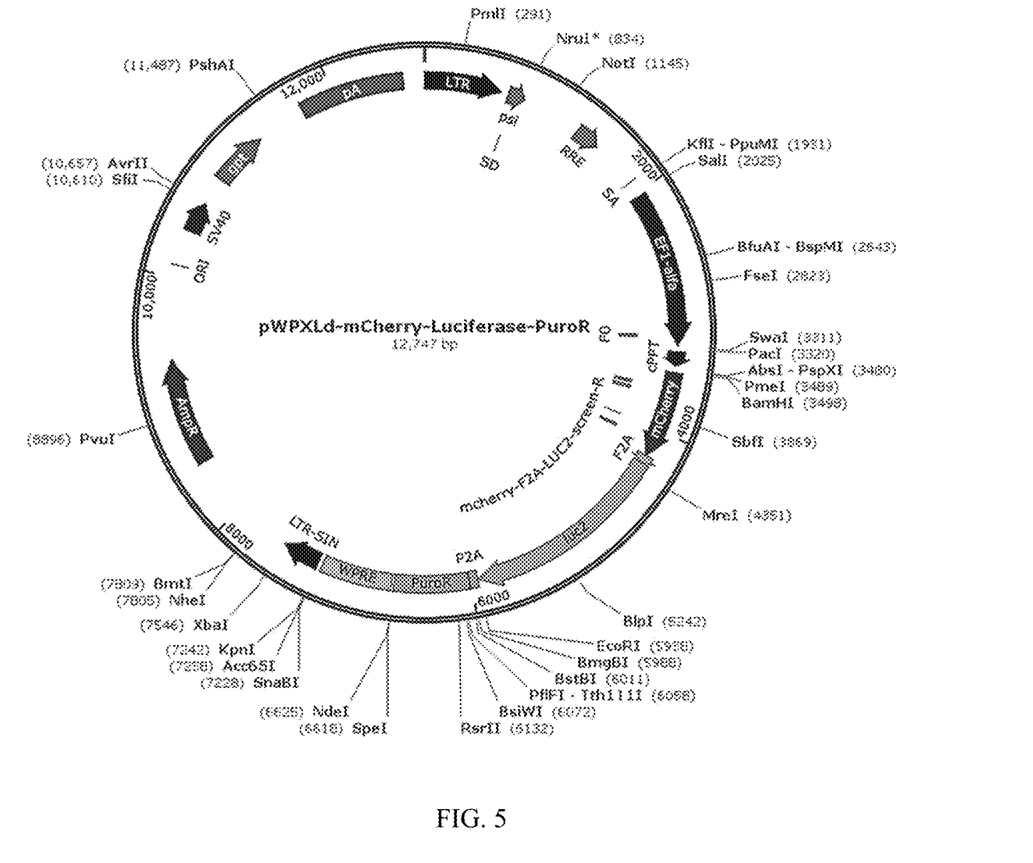
FIG. 5 is the schematic diagram of pWPXLd-mcherry-F2A-Luciferase-Puro lentivirus vector.

(II) Experimental Steps (1) Lentiviral vector plasmid (1.1) A pWPXLd-mcherry-F2A-Luciferase-Puro plasmid was constructed, as shown in FIG. 5.

(1.2) Plasmid extraction: Plasmid extraction was carried out with reference to the instruction manual of the endotoxin-free plasmid DNA mass extraction kit N1051.

(2) Lentiviral packaging (2.1) HEK-293T cell culture: The cells were in an exponential growth state.

(2.2) Cell digestion: The cells were digested with trypsin one day before transfection, centrifuged, resuspended in a fresh complete culture medium, passaged to a 10 cm culture dish and cultured in an incubator with 5% $CO_2$ at 37° C. to make the adherence fusion degree of cells reach 80% and above.

(2.3) The fresh complete culture medium was replaced 2 hours before transfection.

(2.4) The PEI, each plasmid and Opti-MEM® I Reduced Serum Medium needed for transfection were placed at room temperature for equilibrium.

(2.5) Preparation of the mixed solution of plasmids: Three plasmids and Opti-MEM® I Reduced Serum Medium were added according to the following dosage, then pipetted evenly and left at room temperature for 10 minutes.

| Plasmid/reagent | Mass/volume |
| --- | --- |
| Target plasmid pWPXLd | 21 μg |
| psPAX2 | 14 μg |
| pMD2.G | 7 μg |
| Opti-MEM ® | 1 mL |

(2.6) Then 120 μL of PEI transfection reagent and 1 mL of Opti-MEM® I Reduced Serum Medium were taken respectively, mixed well and left at room temperature for 10 minutes.

(2.7) Finally, the above solutions were gently mixed and left at room temperature for 10 minutes to form the mixed solution for transfection.

(2.8) The mixed solution was added to the cell surface dropwise and mixed well.

(2.9) 6 hours after transfection, the medium was replaced.

(2.10) 48 and 72 hours after transfection, the supernatant was collected.

(2.11) The collected virus supernatant was centrifuged at 3000 rpm for 30 minutes.

(2.12) The centrifuged virus solution was filtered with a 0.45 μm filter, and the filtrate was stored at −80° C. for later use.

(III) Construction of GL261-Luc-Mcherry Cell Line (3.1) The GL261 cell line was resuscitated and passaged to make the cells in the logarithmic growth phase.

(3.2) The GL261 cells were cultured in a T25 cell culture flask and digested into the single cell suspension with 0.25% trypsin-EDTA.

(3.3) The cells were counted, $5×10^5$ cells were put into the 6-well plate, and the culture medium was added until the final volume was 1.8 mL.

(3.4) 2 μL of Polybrene was added to each well of the 6-well plate and shaken well.

(3.5) 600 μL of pWPXLd-mCherry-F2A-Luciferase virus supernatant was added to each well of the 6-well plate, shaken well and cultured in the incubator at 37° C.

(3.6) 24 hours after transfection, the transfection solution was discarded and replaced with normal culture medium to continue the culture.

(3.7) 48 hours after transfection, the transfection solution was discarded and replaced with the selection medium with 2 μg/mL puromycin to continue the culture.

(3.8) The expression of mCherry in transfected cells was observed.

(IV) Monoclonal Screening of GL261/Mcherry-Luciferase (4.1) 72 hours after transfection, GL261/mCherry-Luc cells were digested and counted.

(4.2) An appropriate amount of cell suspension was diluted, the puromycin concentration was 2 μg/mL, and 50 to 100 cells were added in the 10-cm cell culture dish, shaken well and cultured at 37° C.

(4.3) The single positive cell was labeled under the microscope on the next day, and the medium was changed every two and a half days.

(4.4) 18 days after the screening, clones that had normal morphology and expressed mCherry were observed under the microscope and then selected into a 6-well plate for amplification culture.

(V) Identification of GL261/Mcherry-Luciferase Monoclonal Cell Line (5.1) Positive rate calculated by using Count Star counter: The cell sample was pipetted sufficiently and mixed well, 20 μL of the cells was taken out and added to the counting chamber and allowed to stand for 10 to 30 seconds, and the parameters were set to let the counter automatically count the cells.

(5.2) The Bright-Glo™ buffer was added to the Bright-Glo substrate, reversed, mixed well until all substrate was completely dissolved, and left at room temperature until the substrate was equilibrated to room temperature.

(5.3) The cells were counted, the cell concentration was adjusted to $1×10^6$ cells/mL, 100 μL of cells was added to each well of the 96-well plate, namely $1×10^5$ cells, and then 100 μL of the mixed Bright-Glo detection reagent was added to each well.

(5.4) The cells were incubated at room temperature for 2 minutes until the cell lysis was complete.

(5.5) The chemiluminescence detection was carried out using the multifunctional microplate reader.

Figure 6:
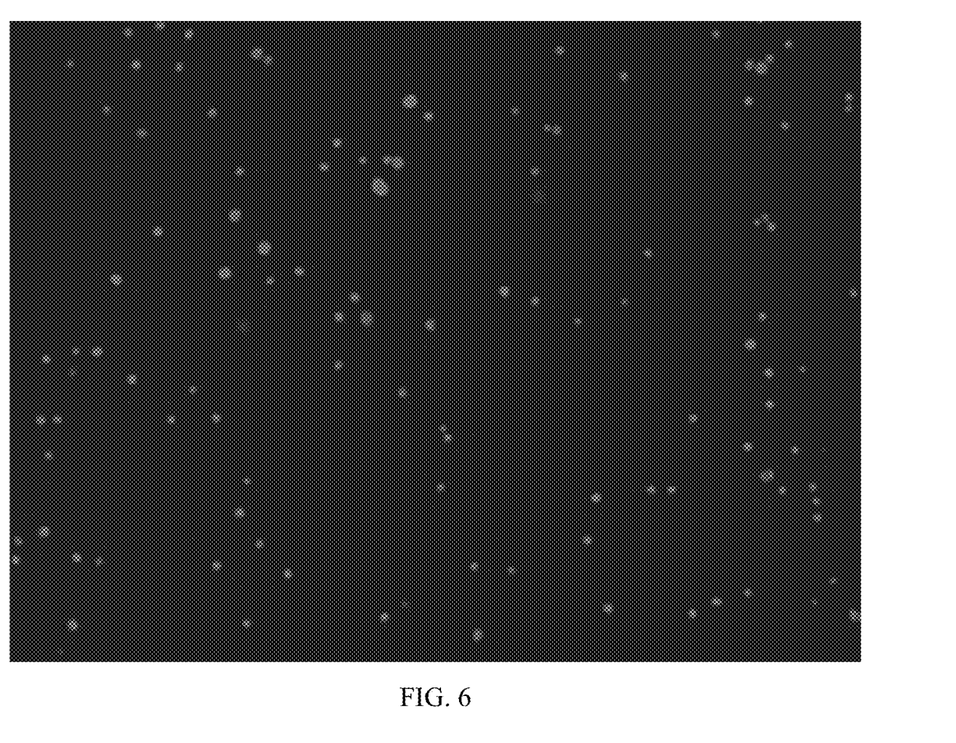
FIG. 6 is the visual field view of positive rate detection of a GL261.mcherry-Luc cell line monoclonal.

(6) Experimental results (6.1) The visual field view of positive rate detection of the GL261.mcherry-Luc cell line monoclone is shown in FIG. 6: the calculated positive rate of monoclone reached 96.49%, so the cell line could be considered as a monoclonal cell line.

Figure 7:
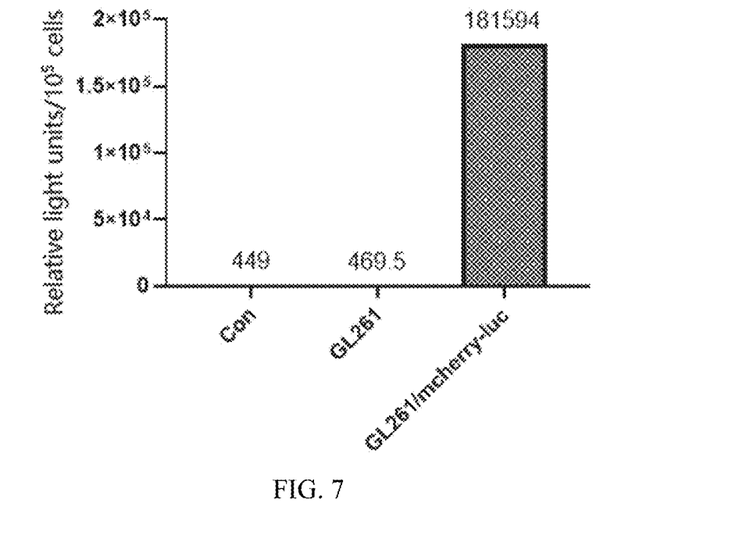
FIG. 7 is the graph of the statistical result of Luciferase activity of GL261.mcherry-Luc cell line.

(6.2) The graph of the statistical result of Luciferase activity of GL261.mcherry-Luc cell line is shown in FIG. 7 (con is the control group in the figure): the luciferase activity of GL261/mcherry-luciferase-C1 monoclone was very strong, so the cell line could be used for in vivo imaging experiment in mice.

Example 5

This example explores the therapeutic effect of *Plasmodium* infection on tumor-bearing mice in intracranial in situ inoculation models of a brain tumor.

(I) Experimental Materials and Reagents animal: C57BL/6 mice, female, 6 to 8 weeks old, from SHANGHAI SLAC LABORATORY ANIMAL CO. LTD.; tumor cell: GL261/mcherry-Luciferase, self-constructed, see Example 4; *Plasmodium*: mouse *Plasmodium yoelii* (*P. yoelii* 17XNL, MRA-593, Py), freely offered by MALARIA RESEARCH AND REFERENCE REAGENT RESOURCE CENTER (MR4); luciferase substrate: D-Luciferin, Potassium Salt D-fluorescein potassium salt, purchased from Shanghai Yisheng Biotechnology Co., Ltd.; Giemsa dye powder: purchased from Sigma-Aldrich® Company; DMEM basic medium: 11995065, purchased from Gibco®; FBS fetal bovine serum: 04-001-1ACS, purchased from BIOLOGICAL INDUSTRIES; Avertin (anesthetic, self-prepared), alcohol, iodine tincture, hydrogen peroxide, normal saline, silicone oil, gentamicin sulfate injection, and erythromycin ointment.

(II) Experimental Instruments in vivo imager: IVIS Spectrum, purchased from PerkinElmer® COMPANY; stereotaxic instrument: purchased from SHENZHEN RWD LIFE SCIENCE CO., LTD.; micro hand-held cranial drill: purchased from SHENZHEN RWD LIFE SCIENCE CO., LTD.; microsyringe: specification of 5 μL, purchased from HAMILTON; electronic digital vernier caliper: No.: 678040, purchased from EXPLOIT TOOLS; surgical instruments (surgical pads, timers, surgical blades, surgical handles, ophthalmic scissors, ophthalmic straight tweezers, ophthalmic curved tweezers, needle holders, sewing needles, cotton swabs, and sutures).

(III) Experimental Steps (1) Establishment of animal model (1.1) Cell revival: The mouse glioma cell line GL261/mcherry-luc was revived and incubated in a constant temperature incubator with 5% $CO_2$ at 37° C.

(1.2) Cell amplification culture: Cells were passaged every 2 to 3 days, and when the cells grew to 80% of the bottom of the petri dish, the cells were digested with 0.25% trypsin-EDTA digestion solution, passaged at a dilution of 1:3.

(1.3) GL261/mcherry-luc cell preparation: The GL261/mcherry-luc cells in the exponential phase growth phase were washed with PBS, digested with trypsin, washed with PBS 3 times, counted, resuspended with RPIM 1640 medium, with the cell concentration of $2\times10^8/\mu L$, and stored on ice.

(1.4) Surgical instruments were disinfected with 75% alcohol.

(1.5) Preparation of injection needles and microsyringes: The injection needle and the connecting hose were filled with silicone oil with a 1 mL syringe to check whether there were blockages and prevent air bubbles. The syringe was replaced with a microsyringe, the injection needle was installed, and an appropriate number of cells were sucked to check whether there was air leakage.

(1.6) Mouse anesthesia: Avertin anesthetic was administered intraperitoneally at a dose of 0.4 mL/20 g of body weight to anesthetize mice.

(1.7) Mouse shaving: The hair on the top of the head was shaved with a shaving knife, and the hair between eyes and ears was shaved clean.

(1.8) The mouse was fixed to the brain stereotaxic instrument, firstly, the mouse teeth were fixed (the incisors were put on the opening of the nose clip), the mouth was slightly opened with tweezers, the tongue was pulled out, then the back of the head was fixed (the ear rods were put in both ears mainly to fix the cheekbones), and finally, the nose clip was fixed tightly.

(1.9) The skin was disinfected with iodine tincture, the skin was cut with a scalpel along the midline, the incision was made approximately 10 mm from the back of the eyes to the ears, the connective tissue on the skull was scraped with the assistance of the scalpel, and the skull was wiped with cotton swabs dipped with hydrogen peroxide to make the anterior fontanel of the skull clearer.

(1.10) The tip of the injection needle was aimed at anterior fontanelle, with anterior fontanelle as the reference point, the transverse direction of the head of the mouse was taken as the X-axis, the longitudinal midline was taken as the Y-axis, the X-axis and Y-axis of the stereotaxic instrument were both set as 0 mm, the injection needle was moved, 1 mm ahead the X-axis was the drilling position, at 1.8 mm right to the midline of the Y-axis, the injection needle was lowered to aim at the surface of mouse skull, the Z-axis was set as 0 mm, the injection needle was raised, and the drilling position of the skull was marked with a pencil, with the hole diameter of about 2 mm.

(1.11) Injection of cells: The injection needle was set at the position of anterior fontanel, and the injection position (1.8 mm right, 1 mm ahead and 3.4 mm deep) was set using an XYZ digital display spectrometer, cells were injected with the injection volume of 1 μL for about 1 minute, the needle was retained for 5 minutes, and the needle was slowly withdrawn.

(1.12) Suture: After suture, erythromycin ointment was applied to the wound, and then 0.1 mL of gentamicin sulfate injection was injected intramuscularly.

(1.13) In vivo imaging: On Day 7 after tumor inoculation, the mouse was imaged in vivo, and the total luminous flux of the tumor site in the head of the mouse was calculated.

(1.14) Experimental grouping: By stratified random sampling, the mice were divided into two groups: control glioma group (GL261) and *P. yoelii* treatment group (GL261+Py).

(2) Tumor-bearing mice were inoculated with *Plasmodium* in the following specific method.

(2.1) *Plasmodium* revival: Murine *Plasmodium* blood (1.0 mL/vial) cryopreserved in the liquid nitrogen tank was quickly shaken in a 37° C. water bath cauldron, mixed well and thawed to keep the activity of *Plasmodium*.

(2.2) *Plasmodium* inoculation: After the *Plasmodium* blood was mixed well, the *Plasmodium* blood was inoculated intraperitoneally into C57BL/6 mice with 0.2 mL/mouse, and two mice were inoculated each time.

(2.3) Preparation of thin blood film and microscopic examination: About 1 to 1.5 μL of blood was collected from tails of mice and smeared on slides to prepare a 2.5-cm long tongue-shaped thin smear blood film, and the prepared smear was blow-dried with a blower. The blood film was infiltrated with methanol for 1 minute, stained with 1×Giemsa stain solution for 30 minutes, rinsed with tap water and blow-dried. The *Plasmodium* parasitemia was observed by a 100× oil immersion objective lens. Changes of the *Plasmodium* infection rate were observed.

(2.4) Preparation of a *Plasmodium* solution: When the parasitemia reached 3% to 10%, firstly, the red blood cells were counted, 5 μL of blood was taken from tails and resuspended in 995 μL of PBS, and the red blood cells were counted. The number of red blood cells infected with *Plasmodium* per mL was calculated. The EP tubes were moistened with 0.2 mL of 3.8% sodium citrate anticoagulant, the blood was taken from eyeballs, the required concentration and total amount of *Plasmodium* to be inoculated were calculated, and the *Plasmodium* was prepared into the concentration of $2.5\times10^6$/mL with PBS.

(2.5) Inoculation of tumor-bearing mice: 7 days after the tumor was subcutaneously inoculated, each mouse was inoculated with 0.2 mL of red blood cell solution, that is, each mouse was inoculated with $5\times10^5$ *Plasmodium* parasites, and each mouse in the control group was inoculated with the same amount of red blood cell solution containing no *Plasmodium*.

(3) Detection indexes (3.1) In vivo imaging of mice: In vivo imaging was carried out on mice every 7 days, and the total luminous flux of the brain was calculated to characterize the size of the brain tumor. The tumor size was represented by the mean tumor volume±the standard error of the mean (SEM), and the tumor growth curve was drawn. The statistical analysis between groups was performed through the two-way ANOVA, where "*" represents $p\leq0.05$, and "**" represents $p\leq0.01$, indicating that differences between groups were statistically significant.

(3.2) Survival statistics of mice: The survival was evaluated by a median survival time and a percentage of a prolonged survival time. The survival rate was estimated by the Kaplan-Meier method, the survival curve was drawn, and the median survival time was calculated, where "*" represents $p\leq0.05$, and "**" represents $p\leq0.01$, indicating that differences between groups were statistically significant.

(3.3) Statistics of the *Plasmodium* parasitemia: The *Plasmodium* parasitemia was evaluated by the percentage of red blood cells infected with *Plasmodium* in mice, where the calculation formula was (the number of red blood cells infected with *Plasmodium*/the total number of red blood cells)×100%. Specific operations were as follows: blood was taken from tail veins and smeared on a slide, fixed with methanol, and stained with Giemsa stain solution. The number of red blood cells infected with *Plasmodium* and the total number of red blood cells were observed under a microscope. The total number of red blood cells was about 1000. The *Plasmodium* parasitemia was calculated and represented by the mean infection rate±the standard error of the mean (SEM), the *Plasmodium* infection cycle curve was drawn, and whether the chemotherapeutic agent had an effect on *Plasmodium* infection was observed.

(3.4) Weight of mice: The mice were weighed every 3 days and the weight growth was represented by the mean weight±the standard error of the mean (SEM). The effects of the chemotherapeutic agent and *Plasmodium* infection on the weight of tumor-bearing mice were observed.

Figure 8:
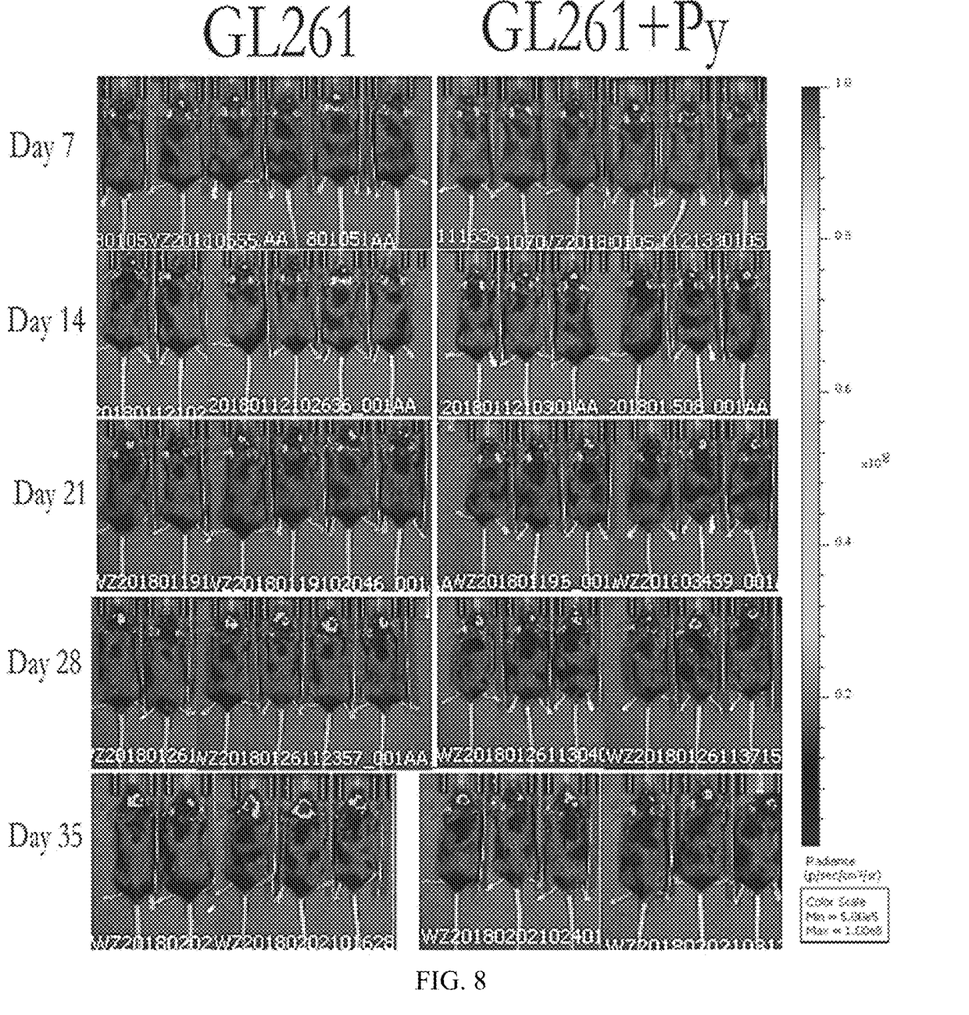
FIG. 8 shows results of the in vivo imaging of *Plasmodium* infection on the glioma growth of tumor-bearing mice in intracranial in situ inoculation model.
Figure 9:
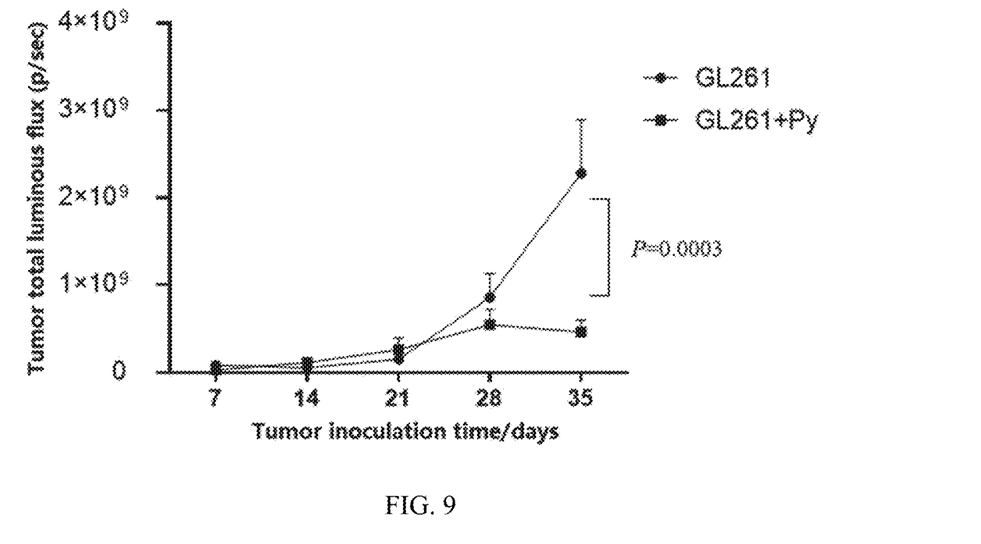
FIG. 9 shows results of the effect of *Plasmodium* infection on the glioma growth of tumor-bearing mice in intracranial in situ inoculation model.

(4) Experimental results (4.1) The in vivo imaging results of *Plasmodium* infection on the glioma growth in tumor-bearing mice are shown in FIG. 8, and the change of total tumor luminous flux with time is shown in FIG. 9. As can be seen from FIGS. 8 and 9, compared with the control group, in the *Plasmodium* treatment group, the growth of glioma GL261 intracranially inoculated in situ in mice was significantly inhibited (p=0.0003, **).

Figure 10:
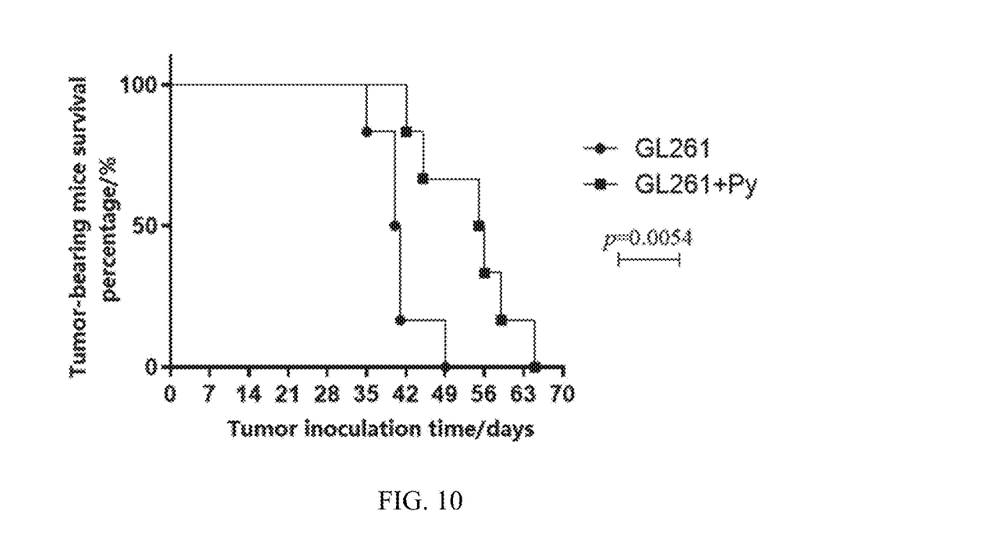
FIG. 10 shows results of the effect of *Plasmodium* infection on the survival time of tumor-bearing mice in intracranial in situ inoculation model.

(4.2) The survival curve of tumor-bearing mice is shown in FIG. 10. Compared with the control group, in the *Plasmodium* treatment group, the *Plasmodium* infection significantly prolonged the survival time of tumor-bearing mice intracranially inoculated in situ, and the median survival time was prolonged from 40.5 days to 55.5 days (p=0.0479, *).

Figure 11:
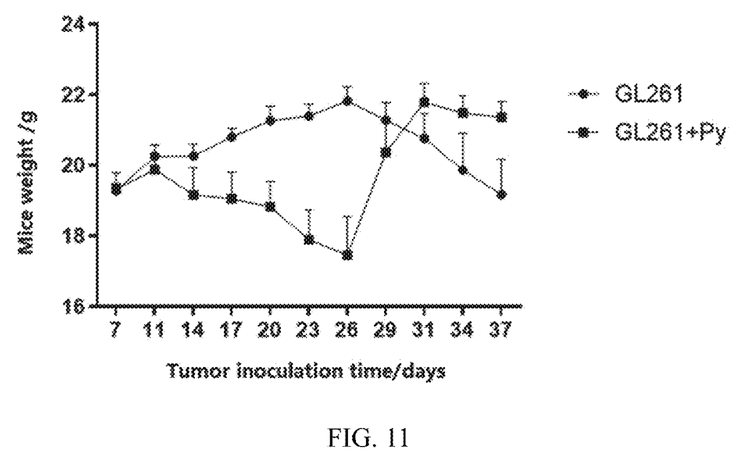
FIG. 11 shows results of the effect of *Plasmodium* infection on the weight of tumor-bearing mice in intracranial in situ inoculation model.
Figure 12:
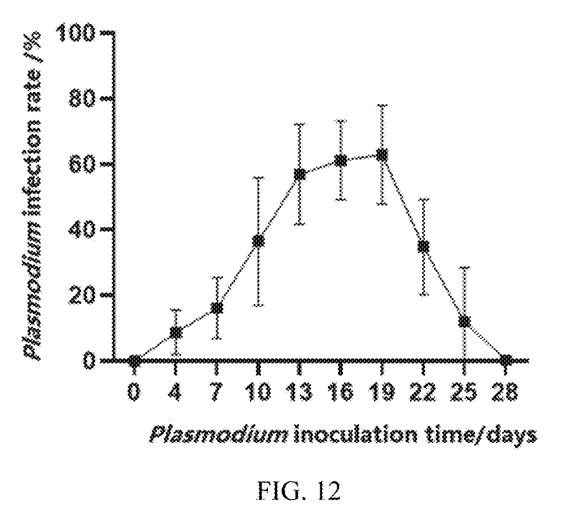
FIG. 12 is the trend chart of the *Plasmodium* parasitemia of the *Plasmodium* treatment group in intracranial in situ inoculation model.

(4.3) The weight change of tumor-bearing mice is shown in FIG. 11, and the change of *Plasmodium* parasitemia is shown in FIG. 12. As can be seen from FIGS. 11 and 12, the body weight of the mice in the control group began to decrease gradually due to the increase of tumor load; with the increase of *Plasmodium* infection, the weight of tumor-bearing mice in the *Plasmodium* treatment group gradually decreased, the weight was the lowest when the infection rate was the highest, and then with the gradual decrease of *Plasmodium* infection, the weight of mice gradually increased.

The applicant has stated that although the drug for preventing and/or treating brain tumors and the use thereof in the present application are described through the preceding embodiments, the present application is not limited to the preceding embodiments, which means that implementation of the present application does not necessarily depend on the preceding embodiments. It should be apparent to those skilled in the art that any improvements made to the present application, equivalent replacements of raw materials of the product of the present application, additions of pharmaceutical excipient ingredients, selections of specific manners, etc., all fall within the protection scope and the disclosure scope of the present application.

Although the preferred embodiments of the present application have been described above in detail, the present application is not limited to details of the preceding embodiments, and various simple modifications can be made to the technical solutions of the present application without departing from the technical concept of the present application. These simple modifications are all within the protection scope of the present application.

In addition, it is to be noted that if not in collision, the specific technical features described in the preceding embodiments may be combined in any suitable manner. In order to avoid unnecessary repetition, the present application does not further specify any of various possible combination manners.

What is claimed is:

1. A drug for preventing and/or treating brain tumors, wherein the drug comprises at least one *Plasmodium* strain;
   wherein the brain tumors are primary brain tumors or metastatic brain tumors;
   wherein the *Plasmodium* strain is cryopreserved and resuscitated *Plasmodium* strain;
   wherein the cryopreserved and resuscitated comprises the following steps:
   (1) cryopreservation of *Plasmodium*;
   (1.1) centrifuging whole blood containing *Plasmodium* at 300×g for 5 minutes, and transferring plasma to another 50 mL centrifuge tube;
   (1.2) removing leukocyte layer, and adding 2 volumes of 1640 culture medium, mixing well and centrifuging at 300×g for 5 minutes;
   (1.3) dropping an equal volume of 28% glycerol cryopreservation solution slowly into the 50 mL centrifuge tube, shaking and mixing well while adding, and incubating at room temperature for 5 minutes;
   (1.4) packing a RBC-glycerol cryopreservation solution mixture separately in cryopreservation tubes, 1.0 mL per tube;
   (1.5) putting the cryopreservation tubes into a cryopreservation box and directly storing the cryopreservation box into liquid nitrogen;
   (1.6) performing quality control by adding a proper amount of the RBC-glycerol cryopreservation solution mixture before cryopreservation to a proper amount of RPMI 1640 culture medium, culturing in an incubator with $CO_2$ at 37° C. for 72 hours, and observing the color of the culture medium to confirm absence of turbidity;
   (2) resuscitation of *Plasmodium*;
   (2.1) preparing a 37° C. water bath cauldron, 50 mL centrifuge tubes, 3.5% NaCl solution, sodium chloride injection, a centrifuge, printed labels, and forms;
   (2.2) checking labels of cryopreservation tubes;
   (2.3) taking a cryopreserved *Plasmodium* blood and bath in water at 37° C. for 1 to 3 minutes, mixing well quickly and thawing;
   (2.4) transferring the cryopreserved *Plasmodium* blood to a 15 mL centrifuge tube, adding an equal volume of 3.5% NaCl solution slowly along the tube wall, pipetting gently and mixing well, standing at room temperature for 5 minutes, and discarding a supernatant;
   (2.5) adding 5 volumes of 0.9% NaCl solution along the tube wall, pipetting gently and mixing well, centrifuging at 300×g for 5 minutes, and discarding a supernatant;
   (2.6) adding normal saline to achieve 50% hematocrit, mixing well, counting and recording red blood cells density, and storing temporarily at 4° C. for clinical inoculation;
   (2.7) performing quality control by smearing remaining blood samples, preparing blood smears, and observing parasitemia and *Plasmodium* status via microscopy before injection, and recording.

2. The drug for preventing and/or treating brain tumors of claim 1, wherein the brain tumors are glioma, meningioma, pituitary adenoma or neurilemmoma.

3. The drug for preventing and/or treating brain tumors of claim 1, wherein the *Plasmodium* strains are selected from the group consisting of *Plasmodium vivax* and *Plasmodium falciparum*.

4. The drug for preventing and/or treating brain tumors of claim 1, wherein a dosage form of the drug is any pharmaceutically acceptable dosage form.

5. The drug for preventing and/or treating brain tumors of claim 4, wherein a dosage form of the drug is an injection.

6. The drug for preventing and/or treating brain tumors of claim 1, further comprising at least one pharmaceutically acceptable pharmaceutical excipient;

wherein the pharmaceutical excipient comprises a thickener, a diluent, a flavoring agent, an adhesive or a filler.

7. The drug for preventing and/or treating brain tumors of claim 1, wherein the drug is a drug carried on a pharmaceutical carrier;

wherein the pharmaceutical carrier comprises a liposome, a micelle, a dendrimer, a microsphere or a microcapsule.

8. A method for treating brain tumors, comprising:
(a) administering to patients a therapeutically effective amount of the drug according to claim 1; and
(b) maintaining *Plasmodium* infection to a chronic or subacute phase.

9. The method of claim 8, wherein step (b) is: maintaining the *Plasmodium* infection for 6 to 8 weeks.

10. The method of claim 8, wherein the brain tumors comprise primary brain tumors or metastatic brain tumors.

11. The method of claim 10, wherein the brain tumors comprise glioma, meningioma, pituitary adenoma or neurilemmoma, preferably glioma.

* * * * *